United States Patent [19]

Nabuurs

[11] Patent Number: 5,618,081
[45] Date of Patent: Apr. 8, 1997

[54] MECHANISM FOR MOVING A PANEL WITH RESPECT TO A ROOF OF A VEHICLE

[75] Inventor: Martinus W. M. Nabuurs, Overloon, Netherlands

[73] Assignee: Inalfa B.V., Venray, Netherlands

[21] Appl. No.: 357,682

[22] Filed: Dec. 13, 1994

[30] Foreign Application Priority Data

Dec. 13, 1993 [NL] Netherlands ............... 9302166

[51] Int. Cl.⁶ ................................................ B60J 7/047
[52] U.S. Cl. ........................ 296/216; 296/220; 296/223
[58] Field of Search .......................... 296/223, 216, 296/220

[56] References Cited

U.S. PATENT DOCUMENTS 5,238,290  8/1993  Farmont ........................... 296/216
5,288,125  2/1994  Huyer ............................ 296/223 X

FOREIGN PATENT DOCUMENTS

0437283A1  7/1991  European Pat. Off. .
0543427A1  5/1993  European Pat. Off. .
4101288    7/1991  Germany ......................... 296/216

*Primary Examiner*—Dennis H. Pedder
*Attorney, Agent, or Firm*—Skjerven, Morrill, MacPherson, Franklin & Friel; Alan H. MacPherson; Thomas S. MacDonald

[57] ABSTRACT

The invention relates to a mechanism for moving a panel with respect to a roof of a vehicle between a first position, in which said panel closes an opening provided in the roof of the vehicle, and a second position, in which said panel releases the opening provided in the roof of the vehicle at least for the greater part. The panel is near its sides supported by supports, which are first pivoted obliquely upwards by means of a setting mechanism so as to move the panel from the first position to the second position, and which are then moved to a position above the roof portion located beside the opening. A support is coupled, via a gear transmission which is movable by means of the setting mechanism, to a rack which is capable of movement with respect to the support.

5 Claims, 7 Drawing Sheets

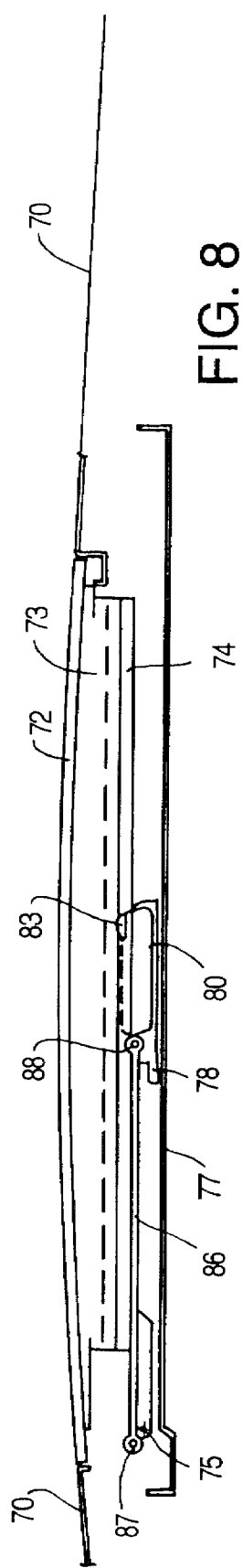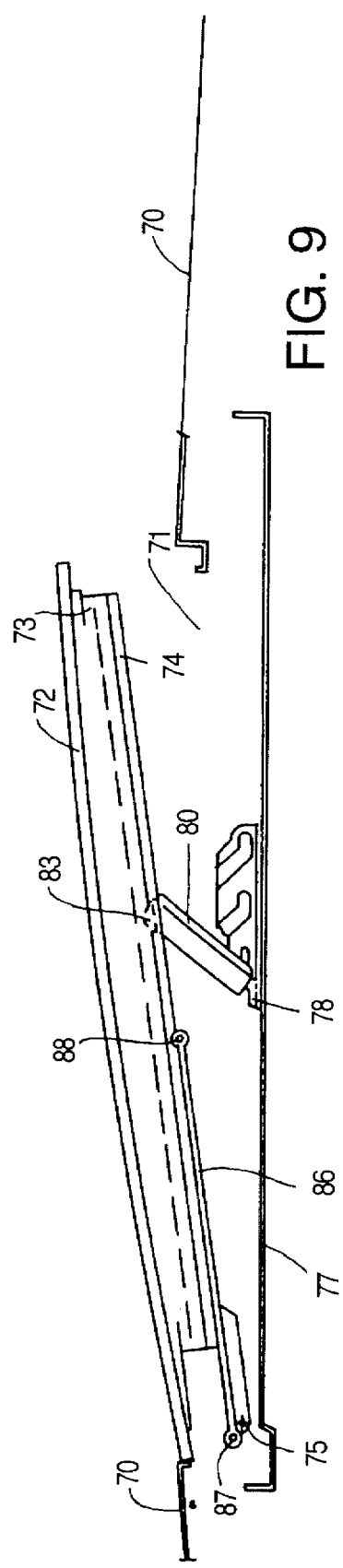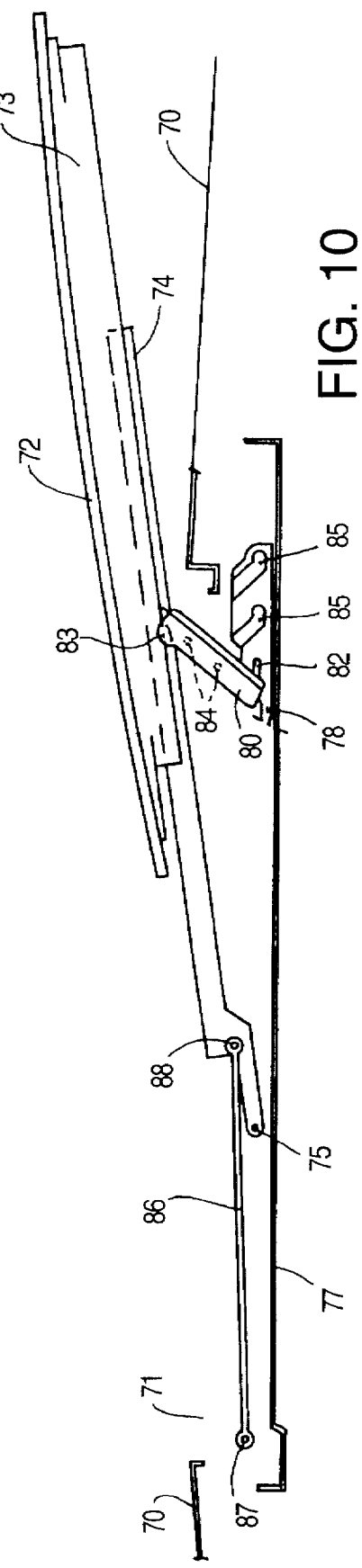

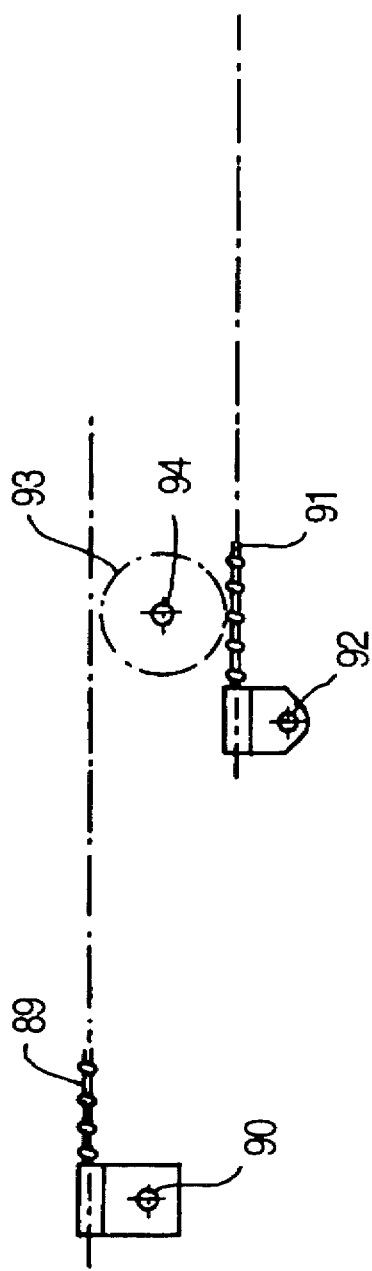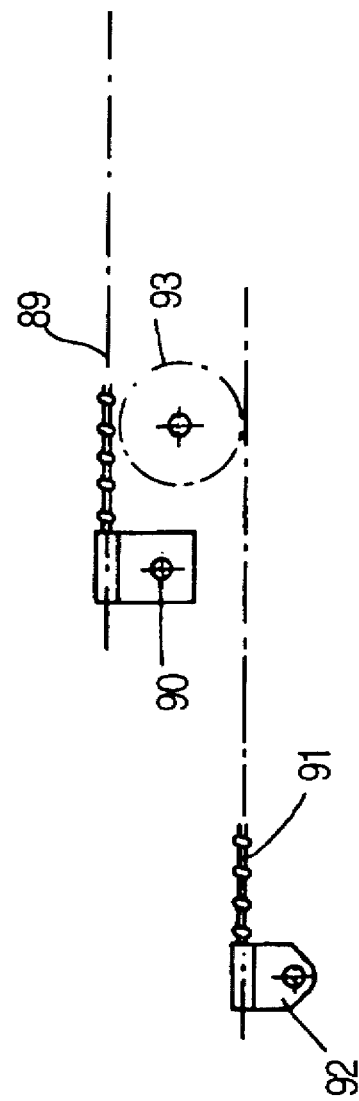

5,618,081

MECHANISM FOR MOVING A PANEL WITH RESPECT TO A ROOF OF A VEHICLE

FIELD OF THE INVENTION

The invention relates to a mechanism for moving a panel with respect to a roof of a vehicle between a first position, in which said panel closes an opening provided in the roof of the vehicle, and a second position, in which said panel releases or opens the opening provided in the roof of the vehicle at least for the greater part, said panel near its sides extending in the intended direction of movement of the panel being supported by supports, which can be pivoted into an upwardly sloping position by setting means so as to move said panel from said first position to said second position, and which can be moved in the direction of movement of the panel.

A mechanism of this type is known from European Patent Application No. 0 543 427. With this known construction the panel still extends over part of the opening in its second position.

SUMMARY OF THE INVENTION

The object of the invention is to obtain a mechanism of the above kind, which upon being used makes it possible to release or opens a larger part of the opening provided in the roof of the vehicle in the second position of the panel.

According to the invention this can be achieved in that a rack-like means extending in the direction of movement is coupled to the support, whilst a further rack-like means is secured to the panel and a gear, which is in engagement with the two rack-like means, is located between the two rack-like means, and in that means are provided by which the rack-like means coupled to the support and being movable in its longitudinal direction with respect to the support can be stopped from moving along with the support for at least part of the displacement of said support.

When using the construction according to the invention the panel will be moved jointly with said supports and said rack-like means during the initial movement of the panel between the first position and the second position.

After a movement over a predetermined distance has taken place the one rack-like means will be stopped, which makes it possible upon further movement of the panel and the support by means of the setting mechanism to effect a movement of the support and the panel with respect to the stopped rack-like means via the gear-rack transmission, so that when the panel moves between said first position and said second position it is possible to effect a movement of the panel over a comparatively large distance compared with the movement of the setting mechanism, as a result of which the opening in the roof can be released to a greater extent than is the case with the known constructions.

It is noted that from European Patent Application No. 0 437 283 a mechanism for moving a panel of a roof of a vehicle is known, which is provided with a gear-rack transmission. One of the racks is fixed to the roof or may be capable of movement along the roof. A possibility to put the panel in an upwardly sloping position cannot be derived from the said publication.

The invention will be explained in more detail hereafter with reference to a few embodiments of the construction according to the invention diagrammatically illustrated in the accompanying Figures.

BRIEF DESCRIPTION OF DRAWINGS

FIG. 8 shows part of a roof of a vehicle and a panel closing an opening provided in the roof according to a second embodiment of the invention.

FIG. 9 is a sectional view corresponding with FIG. 8, wherein the panel is illustrated in an upwardly sloping position.

FIG. 10 is a sectional view corresponding with FIGS. 8 and 9, wherein the panel is illustrated in its entirely open position.

FIG. 16 diagrammatically shows parts of the transmission mechanism.

FIG. 17 shows the parts of the transmission mechanism shown in FIG. 16 in a second position.

DETAILED DESCRIPTION

Figure 1:
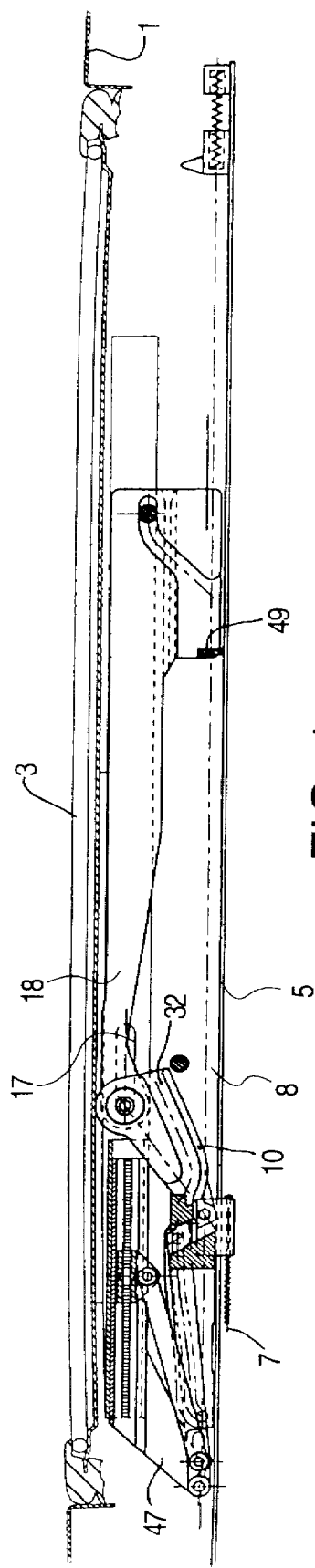
FIG. 1 is a diagrammatic view of the panel in a first position, wherein the panel closes an opening provided in a roof of a vehicle, and wherein a few parts have been left out for easy reference.

As already said before the construction according to the present application largely corresponds with the construction disclosed in European Patent Application No. 0 543 427. For a detailed description of the construction according to the present application and its operation reference is therefore made to the aforesaid publication, whose contents are considered to be incorporated herein by this reference. For the sake of convenience those parts depicted in the present application that correspond with the parts shown and described in the aforesaid publication have been given the same numerals as in the aforesaid publication.

As described in the said publication a roof 1 of a vehicle is provided with a recess or opening 2, which can be closed by means of a panel 3. Near its sides extending in the direction of movement of the panel the panel 3 is thereby on either side provided with setting mechanisms 4, by means of which the panel 3 can be moved in the longitudinal direction of the vehicle, from the position closing the opening 2 to a position in which the opening 2 is at least partially released or opened. Each setting mechanism 4 thereby comprises a guide rail 5 secured to the roof, in which a driving slide 8 is reciprocatingly movable by means of a pull-push cable 7, which is movable lengthwise by means of a motor (not shown) or by means of a manually operated mechanism. A tilting lever 10 is pivotally connected with the driving slide by means of a pivot pin 11. A curved groove 32 is provided in said tilting lever 10, said groove co-operating with a fixedly arranged guide pin 31 so as to pivot the tilting lever 10. The driving slide 8 is furthermore connected to one end of a coupling arm 24, whereby a pin 25 provided on said end of the coupling arm is positioned within a control slot 26 provided in the driving slide 8. At its end remote from the pin 25 the coupling arm 24 is provided with a tilting cam 27.

A support or section 18 extending parallel to the respective side of the panel 3 is provided on each side of the panel 3. A slotted hole 17 extending parallel to the side of the panel 3 is provided in said section 18, in which slotted hole a pin 13 secured to, the tilting lever 10 is slidably accommodated.

In applicant's invention the section 18 is integral with a section 40 having a substantially C-shaped section, which extends along part of the length of section 18.

Figure 7:
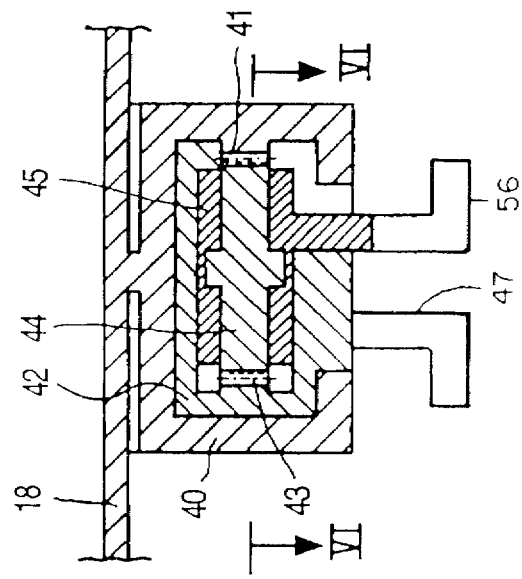
FIG. 7 is a sectional view of FIG. 6, along the line VII—VII in FIG. 6.

As is apparent in particular from Applicant's FIG. 7 a rack 41 being integral with the C-shaped section 40 and extending in the longitudinal direction of the section is formed in the interior of the space defined by the C-shaped section 40.

Furthermore a sliding piece 42 is accommodated within the cavity formed by C-shaped section 40, the sliding piece being movable in the longitudinal direction of section 40. The sliding piece 42 is provided with a rack 43 positioned opposite rack 41, the rack 43 thus being movable lengthwise with respect to the section 18 forming a support for the panel 3.

A pinion or gear 44, which is in engagement with the two racks 41 and 43, is arranged between the racks, the pinion or gear being journalled in a supporting block 45 so as to be freely rotatable about its axis of rotation, to which supporting block a coupling arm 56 is secured.

Figure 3:
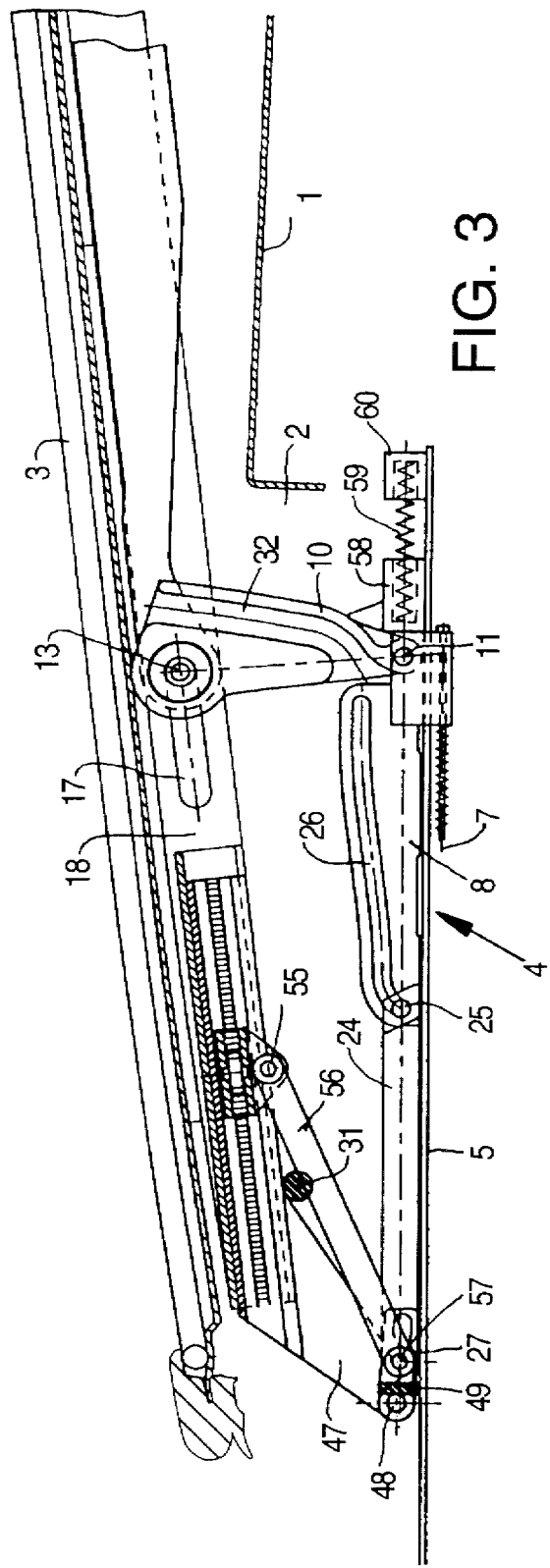
FIGS. 3 and 4 illustrate further intermediate positions during the movement of the panel from the first position, in which said panel closes the opening in the roof, to the second position, in which the panel at least partially releases or opens the opening in the roof.
Figure 4:
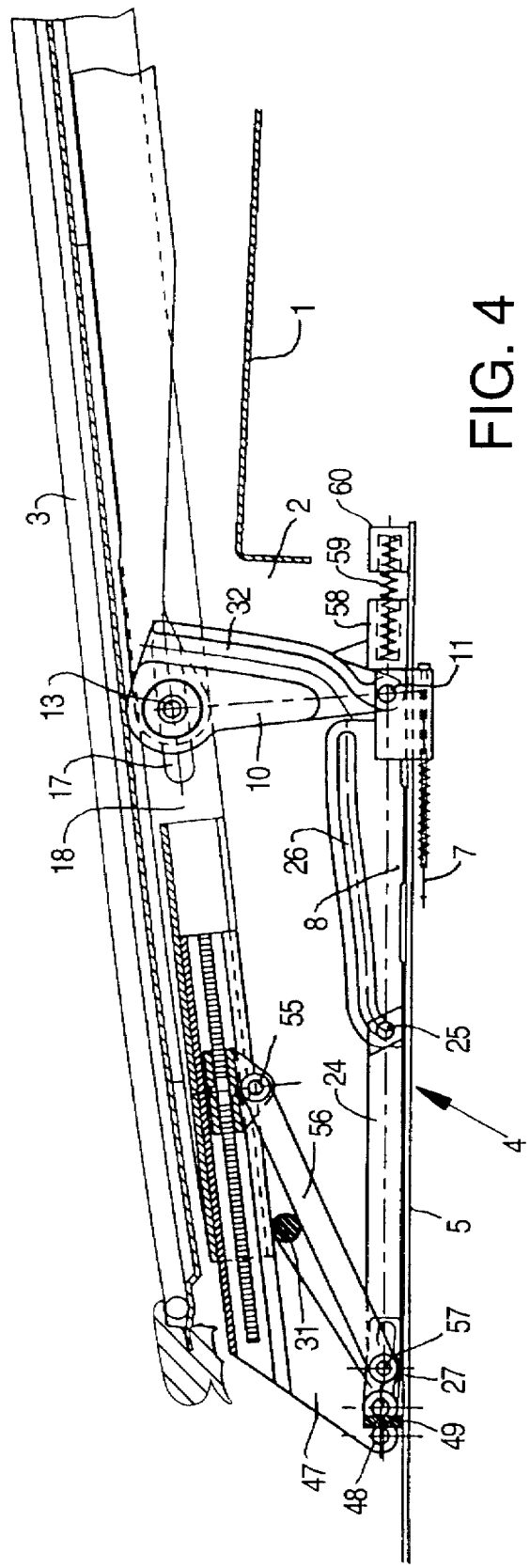

The sliding piece 42 is provided with a projecting arm 47, which is at its end provided with a pin 48 (FIGS. 1–5), which is capable of co-operation, in a manner yet to be described in more detail hereafter, with a stop 49 (FIGS. 3–5) being fixedly disposed with respect to the roof.

The block 45 supporting the pinion 44 is pivotally coupled, by means of a pivot pin 55 (FIG. 2), to one end of the coupling arm 56. The other end of said coupling arm 56 is connected, by means of a pivot pin 57, to the end of the coupling arm located near the tilting cam 27.

A stop means 58 (FIGS. 2–5), which is arranged so as to be movable in the direction of movement of the driving slide 8, is provided so as to limit the movement of the driving slide 8 in the opening direction of the panel, the stop means being movable against the compression of a spring 59, up to a fixedly disposed stop means 60, during the opening of the panel.

Figure 2:
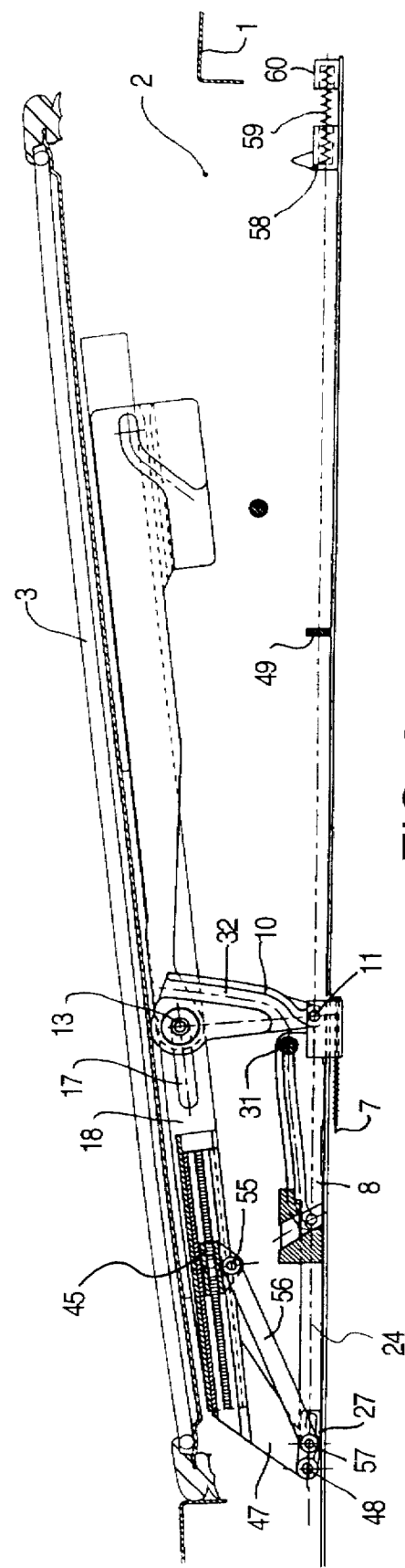
FIG. 2 is a view corresponding with FIG. 1, wherein the panel is tilted upwards at the beginning of the movement between the first position and the second position.

In order to open the panel 3 from the position illustrated in FIG. 1 the driving slide 8 will be moved to the right, seen in the Figures, by means of driving cable 7 or the like. Initially the panel will thereby be opened in a manner similar to the manner described in the aforesaid European Patent Application No. 0 543 427, whereby the tilting lever 10 is tilted by the guide 31, which moves through the slot 32 provided in the tilting lever 10. The pin 13 thereby moves from the left-hand end of slot 17 to the right-hand end of slot 17 (FIG. 2). Then the panel 3 is moved to the right, seen in FIGS. 1–5, together with the supports 18 and the racks 41, 43.

Figure 6:
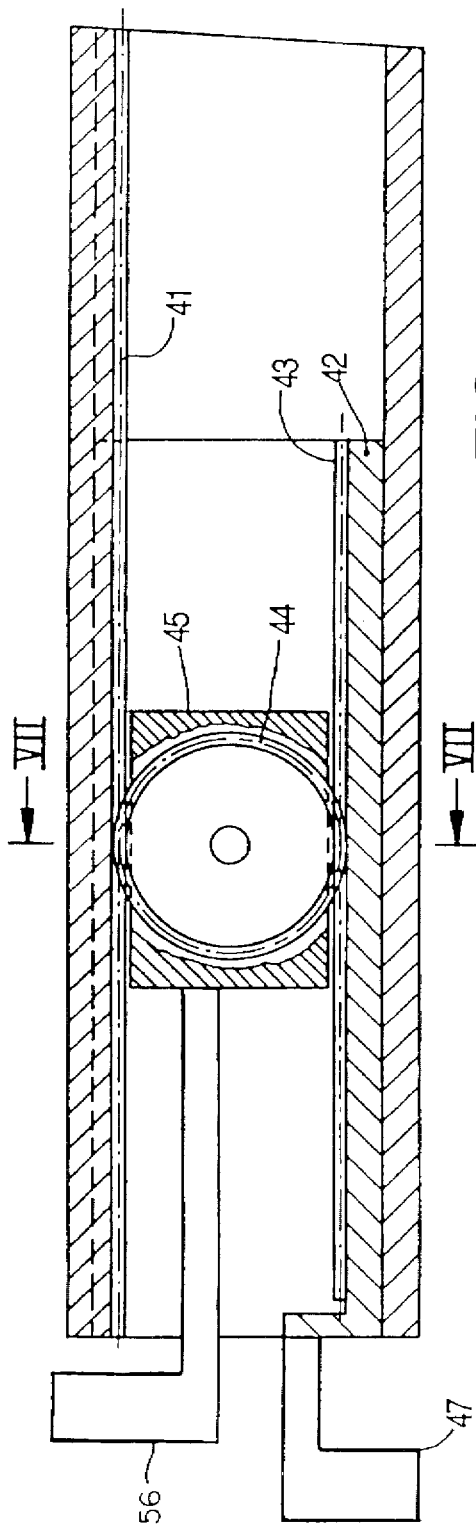
FIG. 6 is a diagrammatic sectional view of a support connected to the panel, a sliding piece and a pinion provided therebetween, along the line VI—VI in FIG. 7.

At some point the stop pin 48, which is secured to the arm 47 connected to the sliding piece 42, will come into contact with stop 49 (FIG. 3), as a result of which a further movement of sliding piece 42 with rack 43 in the opening direction of the panel is prevented. Via coupling arm 24 the coupling arm 56 is taken along in the opening direction, however, so that also block 45 supporting the pinion 44 and being connected to the coupling arm will be moved in the opening direction, whereby pinion 44 will roll over the rack 43 (FIGS. 6 and 7). This rotation of the pinion will be transmitted to the rack 41, as a result of which the rack 41 and with it section 18 secured to panel 3 will likewise be moved in the opening direction. It will be apparent that the gear transmission between the stopped rack 43 and the rack 41 secured to section 18 will thereby move panel 3 in the opening direction, over a distance which is twice the distance over which the driving slide 8 and the parts connected thereto are moved in the opening direction, so that during the last stage of the opening of the panel, the panel can still be moved over a comparatively large distance compared with the distance over which the setting mechanism is moved, as a result of which the opening provided in the roof can be released to a larger extent than is the case with the known construction.

Figure 5:
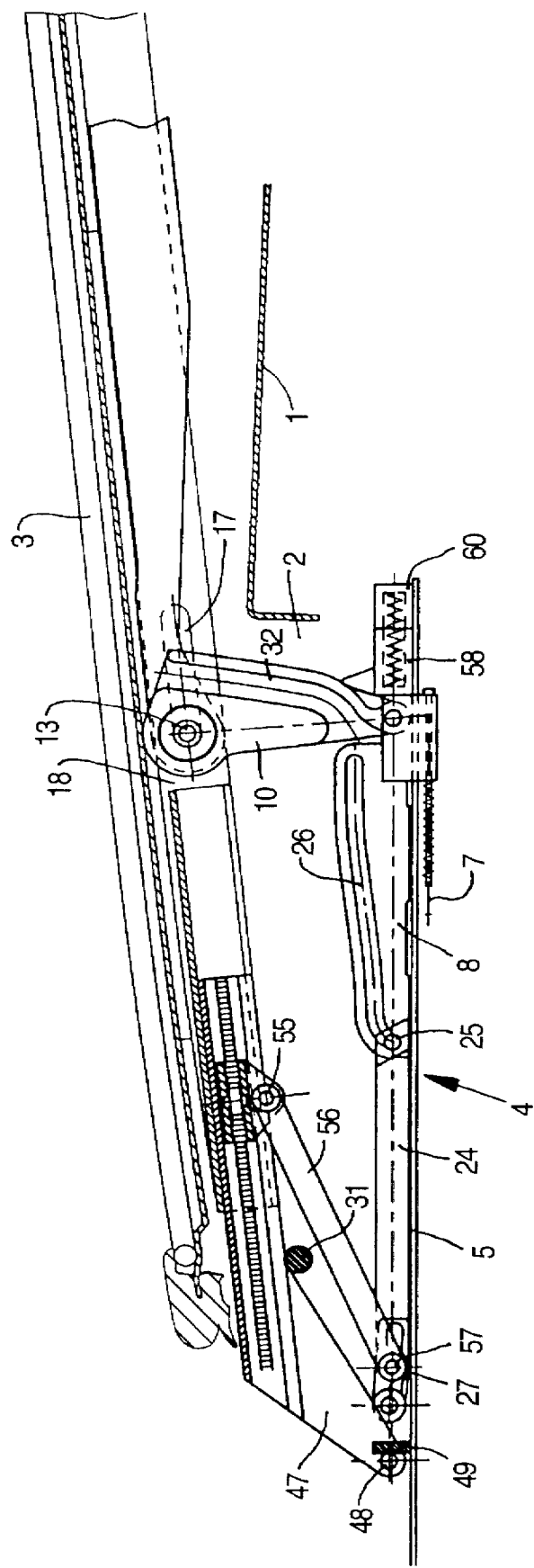
FIG. 5 shows the second or final position of the panel, in which the opening provided in the roof is released or opened by the panel as much as possible.

The final movement of the driving slide 8 is limited by the co-operating stops 58 and 60, when they are pressed together as shown in FIG. 5.

The extra sliding motion of the panel 3 can be accommodated without impediment, because pin 13 can move from the right-hand end to the left-hand end (seen in the Figures) of the slot 17 provided in section 18 again.

As is illustrated with regard to the embodiment diagrammatically illustrated in FIGS. 8–10, an opening 71 is provided in a roof 70 of a passenger space (not shown) of a vehicle, which opening can be closed by a panel 72. Supports 73 are secured to the sides of the panel 72, the supports 73 extending in the intended direction of movement of the panel. The supports are supported so as to be movable lengthwise by guide means 74 extending substantially parallel to said supports 73.

Studs 75 are secured to the left-hand ends of the guide means 74, seen in FIGS. 8–10, the studs being movable along guide means 76 (FIGS. 11–13), which which means 76 is secured to supports 77 secured to the roof 70 (FIGS. 8–10). For easy reference the guide means 76 are not shown in FIGS. 8–10.

Sliding pieces 78 are movable along the guide means 76. Between guide means 76 and sliding pieces 78 tension springs 79 are provided, which attempt to maintain the sliding piece 78 in the position shown in FIGS. 5 and 6 with respect to the guide means 76, the position of the sliding piece 78 corresponding with the closed position of the panel.

Since the means supporting the panel 72 via the supports 73 on each side are of substantially identical construction, the description of the construction of said means below will substantially be concentrated on the means located near one side of the panel.

A tilting lever 80 is pivotally coupled near one end of each of the sliding pieces 78 by means of a pivot pin 81. Pivot pin 81 is capable of movement within a slotted hole 82 provided in said sliding piece and extending in the longitudinal direction of the sliding piece. The end of tilting lever 80 remote from sliding piece 78 is pivotally coupled to a guide means 74 by means of a pivot pin 82.

Figure 12:
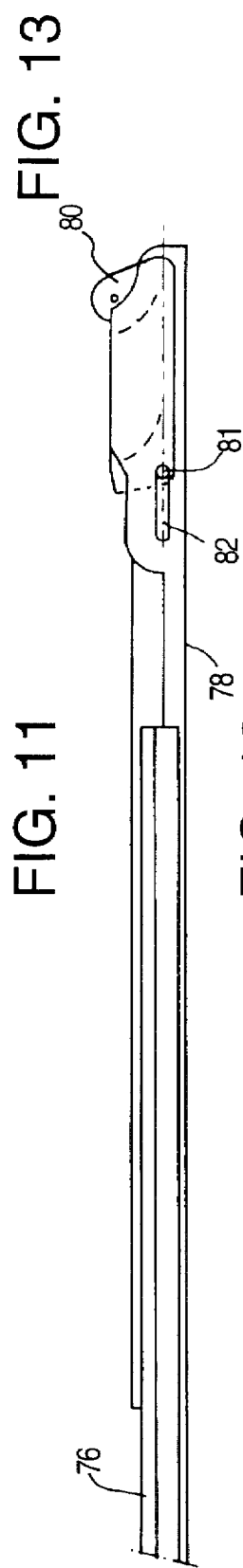
FIG. 12 is a side view of FIG. 11.
Figure 13:
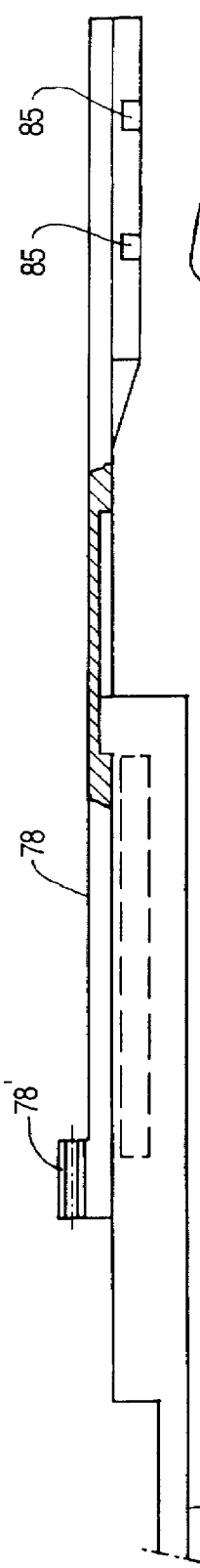
FIG. 13 is a sectional view of FIG. 11, along the line XIII—XIII in FIG. 11.
Figure 14:
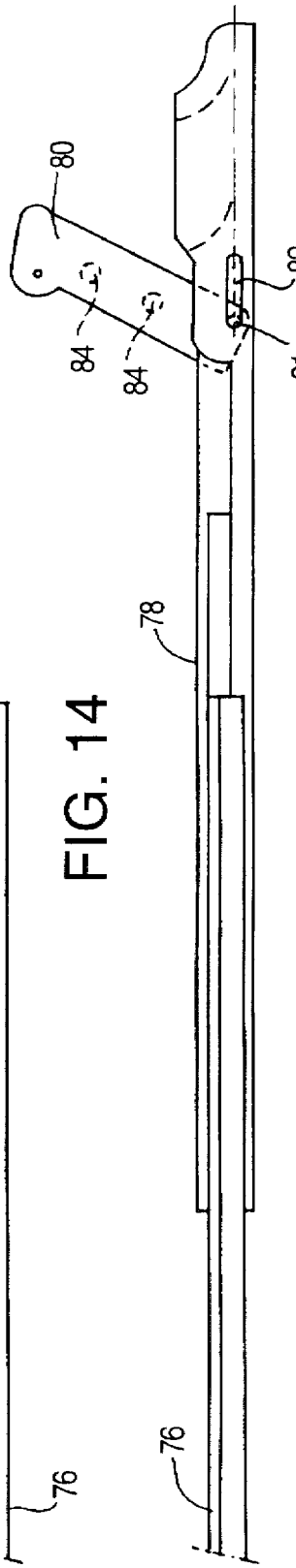
FIG. 14 is a plan view partially in section corresponding with FIG. 11, wherein the parts of the mechanism are illustrated in another position.
Figure 15:
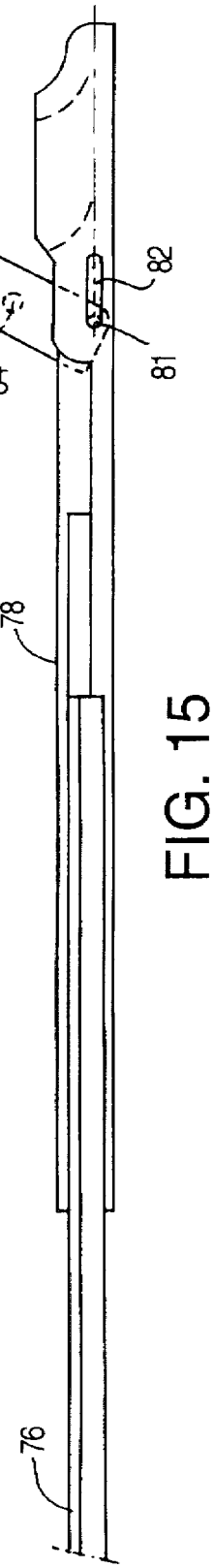
FIG. 15 is a side view of FIG. 14.

Cams 84 are secured to the tilting lever 80, the cams in the position of the tilting lever illustrated in FIGS. 8 and 12 being located within slotted holes 85 provided in the end of the sliding piece 78, whereby said slotted holes, as is apparent in particular from FIGS. 9 and 10, are built up of a horizontal part, which blends into a upwardly sloping part, which is open at the upper side of sliding piece 78, so that the cams 84 can move into and out of the slotted holes 85 at this point.

Each sliding piece is furthermore provided with a connecting part 78' (FIG. 11), to which a push-pull cable not shown may be connected, by means of which the sliding roof can be opened.

A coupling rod 86 is pivotally connected near one end by means of a pivot pin 87 occupying a fixed position with respect to the roof 70. The other end of said coupling rod 86 is connected to a guide means 74 by means of a stud 88, in such a manner that the stud 88 can move in the longitudinal direction of the guide means 74 with respect to said guide means 74.

As is furthermore diagrammatically illustrated in FIGS. 16 and 17 an elongated rack means 89 is provided, which extends between two coupling pieces 90 (only one of which is shown), which are fixed to a support 73 connected to the panel 72 (FIGS. 8–10). A similar rack 91 is connected to the guide means 74 so as to be movable in its longitudinal direction, in such a manner that the rack means 91 movable in the longitudinal direction of the guide means. The rack 91 is thereby connected to the end of the coupling rod 86 by means of a coupling piece 92 and the pin 88 (FIG. 9).

A gear 93 is disposed between the two racks, said gear being in engagement with the second racks 89 as well as with the first rack 91. The gear 93 is thereby rotatably journalled in the guide means 74 by means of a pin 94, whereby the pin 94 occupies a fixed position with respect to the guide means.

In the entirely closed position of panel 72 shown in FIG. 8 the stud 75 abuts against a stop (not shown), in such a manner that the guide means 74 can only move from the position shown in FIG. 8 to the right, seen in this Figure, and not to the left.

Figure 11:
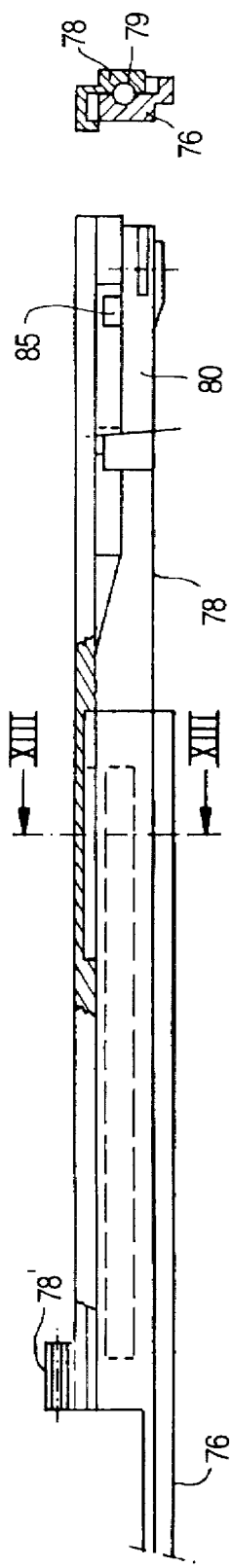
FIG. 11 is a diagrammatic plan view partially in section of parts of the mechanism according to the invention, which are to a large extent not shown in FIGS. 8–10 for easy reference.

In order to move the panel to the open position the sliding piece 78 is moved from the position shown in FIG. 8 and FIGS. 11 and 12 to the right, against the action of the tension spring 79, by means of a pull-push cable to be moved by hand or by means of a motor. This results in a relative movement between the sliding piece 78 and the tilting lever 80, as a result of which the pivot pin 81 moves to the left in the slotted hole 82 and the cams 84 are first moved upwards, out of the horizontally extending parts of the slotted holes 85, and then through the upwardly sloping parts of the slotted holes, as a result of which the tilting lever 80 will pivot about the pivot pin 81. This results in rotation of the panel 72 and the parts connected thereto about the pivot pins 87, so that the panel is pivoted from the closed position shown in FIG. 8 to the upwardly sloping position shown in FIG. 9. In this position further pivoting of the tilting lever in anti-clockwise direction, seen in FIGS. 8–10, is prevented by stop means (not shown). When the sliding piece 78 moves further to the right, seen in FIGS. 8–10, also the guide means 74 will be moved to the right, whereby the stud 75 is moved along the guide means 76. During this movement of the guide means 74 to the right the rack means 91, which is movably accommodated within the guide means 74, is stopped as a result of the means being coupled to the coupling rod 86. The gear 93 is carried along by the guide means 74, however, so that the gear will roll over the rack-like means 91. Since the gear 93 is also in engagement with the rack 89 connected to the support 73, the rack 89 will likewise be moved to the right with respect to the rack 91 and with respect to the guide means 74 upon movement to the right of the guide means 74, as will be apparent from a comparison between FIGS. 16 and 17, whereby FIG. 16 diagrammatically illustrates the initial position of the two rack-like means, namely first and second racks 89 and 91, corresponding with the positions of the support 73 and the guide means 74 relative to each other, and whereby FIG. 17 shows the position of the racks 89 and 91 relative to each other in the entirely open position of the panel, as illustrated in FIG. 10.

Upon movement of the panel 72 to the open position this transmission mechanism between the guide means 74 and the support thus effects a movement to the right, seen in FIGS. 8–10, of the panel 72 over a greater distance than the guide means 74 supporting the panel, so that a considerably larger part of the opening 71 in the roof 70 can be released than is the case when the panel 72 occupies a fixed position with respect to the guide means 74 being pivotable by the tilting lever 80, as has been usual so far.

I claim:

1. A mechanism for moving a panel with respect to a roof of a vehicle between a first position, in which said panel closes an opening provided in the roof of the vehicle, and a second position, in which said panel opens the opening provided in the roof of the vehicle at least for a greater part, comprising:

a panel, said panel having sides extending in a longitudinal direction of movement of the panel;

a support on each panel side, the panel and said supports being pivoted into an upwardly sloping position;

a setting mechanism for moving said panel from said first position to said second position in the direction of movement of the panel;

a first rack extending in the direction of panel movement and coupled to one of the supports;

a second rack secured to the panel and being movable relative to the first rack;

a gear in engagement with the first and second racks; and means for stopping movement of said first rack for at least part of the movement of said one support.

2. A mechanism according to claim 1, wherein said setting mechanism includes a tilting lever and a driving slide, and said panel is pivoted into the upwardly sloping position by said tilting lever, said tilting lever being pivotally coupled to the driving slide, said driving slide being movable in the direction of movement of the panel, and with respect to the supports, a slotted hole in said supports, wherein said tilting lever and said supports are pivotally coupled together and said tilting lever is movable relative to the supports along said slotted hole in the longitudinal direction of said supports.

3. A mechanism according to claim 1, further comprising a stop means for limiting the movement of the setting mechanism, whereby said stop means moves resiliently over a predetermined distance in said direction of movement.

4. A mechanism according to claim 1, further comprising a pivotable coupling rod coupling said gear to said setting mechanism.

5. A mechanism for moving a panel with respect to a roof of a vehicle between a first position, in which said panel closes an opening in the roof of the vehicle, and a second position, in which said panel opens the opening provided in the roof of the vehicle at least for the greater part, comprising:

- a panel, said panel having sides extending in a direction of movement of the panel;
- a setting mechanism for moving the panel from said first position to said second position during which the panel is pivoted into an upwardly sloping position;
- a first rack extending in the in the direction of movement of the panel and being movable coupled to the panel permitting a relative movement between the panel and the first rack;
- a second rack secured to the panel and extending and being movable parallel to the first rack;
- a gear in engagement with the first and second racks and being drivably coupled to the setting mechanism;
- means for stopping said first rack for at least part of the movement of the setting mechanism so that the panel is driven by the setting mechanism and additionally by the gear which rotates as a result of a movement between the setting mechanism and the first rack.

* * * * *